May 8, 1962     J. DRYSDALE     3,033,600

CONNECTORS FOR JOINTING WIRES, RODS AND THE LIKE

Filed May 4, 1960

INVENTOR
John Drysdale
BY
*Leon Simon*
ATTORNEY

United States Patent Office 3,033,600
Patented May 8, 1962

3,033,600
CONNECTORS FOR JOINTING WIRES, RODS AND THE LIKE
John Drysdale, Adel Lane, Leeds, England
Filed May 4, 1960, Ser. No. 26,906
1 Claim. (Cl. 287—114)

The invention relates to connectors for use with solid high tensile steel rods, stranded cables, wires and other similar or suitable members whereby the ends of two such members may be permanently joined together for any suitable purpose where welding is not permissible, thereby enabling joints to be achieved which develop up to the full tensile strength of the rods or the like.

The object of the present invention is to provide a new or improved construction of connectors more particularly though not exclusively intended for mid-span joints for high tensile steel wires. A typical use of such connector is in the joining of wires or rods used in the formation of cables for large suspension bridges and the like.

According to the invention the connector comprises an outer sleeve adapted to house one or two tubular inserts for receiving the ends of wires, rods or the like to be joined, the said insert or inserts being so constructed, that upon the sleeve being compressed the insert or inserts bite into or grip the ends of the wires or the like and also bite or grip the interior of the sleeve.

In order that the invention may be fully and clearly comprehended the same will now be described with reference to the appended drawings, in which.

Figure 2:
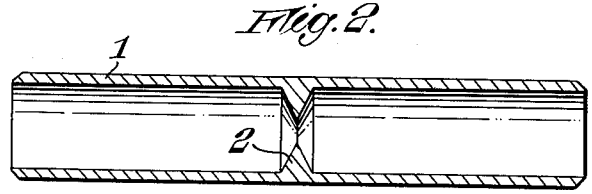
FIGURE 2 is a similar view to FIGURE 1 of an outer member or sleeve forming part of a connector constructed according to the invention.

The outer member of the connector—illustrated separately in FIGURE 2, comprises a sleeve or shell 1 of circular cross-sectional shape of preferably high quality steel which is counterbored from each end to predetermined depths so as to provide a centrally disposed midfeather 2 having an axial bore. It must be understood however that the sleeve may be through bored and the midfeather omitted if desired.

Figure 1:
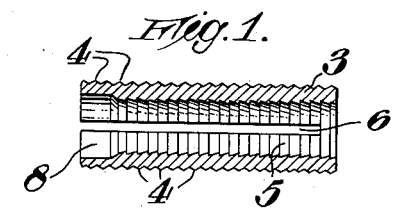
FIGURE 1 is an axial section of an insert forming part of a connector constructed according to the invention.
Figure 3:
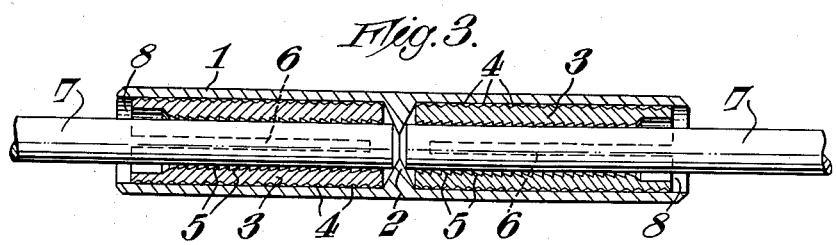
FIGURE 3 is an axial section of a connector constructed and assembled to join the ends of two stranded wire cables according to the invention, but before being subjected to swaging.
Figure 4:
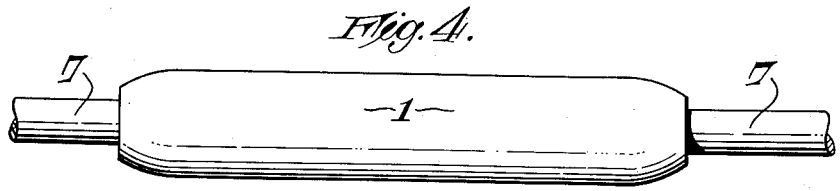
FIGURE 4 is a side elevation of FIGURE 3, after swaging.

Adapted to be located in each of the aforesaid bores of the sleeve 1 is an insert 3 of the kind shown separately in FIGURE 1, each insert being inserted at the respective end of the sleeve as clearly shown in FIGURE 3 of the drawings. Each insert is of tubular construction with an external diameter sufficient to permit a sliding fit within the sleeve 1 and of somewhat shorter length than the depth of the sleeve bores.

The exterior surface of each insert is provided with knurling, serrations or the like 4 and the internal bore has a screw-threaded surface 5 imparted thereto. In the example illustrated at FIGURES 1 and 3 the thread is of the buttress type but any other suitable form of thread may be employed according to the desire of a user.

A pair of narrow slots or saw-cuts 6 are longitudinally formed in the wall of each insert 3, the said slots terminating a short distance from the inner end. The inserts may be retained in the respective bores in the sleeve 1 by slightly peening or burring the outer ends of the sleeve 1 over the corresponding ends of the inserts 3.

A pair of wires 7 to be joined have their ends housed in the inserts 3 of the connector to the full depth of the screw-threaded portions as clearly shown in FIGURE 3 of the drawings, whereupon the assembly of parts is cold-swaged in a hydraulic press or other suitable apparatus furnished with appropriately shaped dies, the pressing being completed in one or more operations depending upon the capacity of the press available.

Compression of the connector as aforesaid causes the projections of the internal screw-threads 5 of the inserts 3 to bite into or grip the wires 7 to be joined, the inserts themselves being retained in the sleeve 1 because of the knurling, serrations or the like 4 co-acting with the bores of the sleeve to form indentations therein. Simultaneously with the heretofore described swaging operation the ends of the sleeve 1 are upset or contoured into close proximity or engagement with the wires 7 to form a substantially weatherproof seal and still further increase the efficiency of the connector.

If desired, the outer end of the insert 3 may be counterbored at 8 to simplify insertion of cable and expedite upsetting or final contouring of the ends of the sleeve 1.

In use the contoured ends of the sleeve provide a lead, which facilitates passage through sheaves and during handling whilst at the same time minimising fouling during positioning.

In a modification of the invention where the midfeather of the sleeve is omitted as already mentioned, a single insert only may be employed in the sleeve. Such a sleeve could be modified accordingly by providing therein pairs of longitudinal slots cut from each end of the insert and terminating somewhat short of the middle. Otherwise the single insert would be furnished with outer serrations and inner screw-threaded portion(s) similar to the insert illustrated at FIGURE 1 and the assembly of parts would be cold-swaged in the manner already herein set forth.

In lieu of a pair of slots 6 in the sleeve, only one, or more than two, may be provided.

I claim:

A connector for permanently joining the ends of high tensile strength rod, cable and wire to provide a joint to enhance the tensile strength of the joint comprising an outer sleeve formed of compressible, high tensile strength material counterbored along the sleeve axis from each end by an equal length to a predetermined centrally disposed midfeather, an intervening centrally disposed midfeather having a bore concentric and coaxial with the counterbored axes, but of smaller diameter to provide an edge supporting ring of triangular cross section integral with the material of said sleeve, a pair of tubular inserts, each of said inserts having an external diameter adapted for slidingly fitting under force into a counterbore in each end of said sleeve and each being slightly shorter in length than said counterbore for receiving one end of wire to be joined, the exterior surface of said insert being serrated along substantially its entire length for gripping the interior surface of said outer sleeve and upon pressing to bring said interior surface into indented relation with the serrations, the interior surface of said inserts being formed with a screw threaded bore for gripping the inserted end of a wire which abuts the sides of said edge supporting ring at said midfeather, said screw threaded bore being formed with at least one longitudinal slot cut from each end and along a substantial part of the length terminating near the inner end thereof to facilitate forcing the inner threads of the insert into biting engagement with the wires to be joined and each of said tubular inserts being counterbored at the end which receives the wire.

References Cited in the file of this patent

UNITED STATES PATENTS

| | | |
|---|---|---|
| 1,817,772 | Sipe | Aug. 4, 1931 |
| 1,854,140 | Hopkins | Apr. 12, 1932 |
| 2,064,440 | Meeker | Dec. 15, 1936 |
| 2,166,457 | Berndt | July 18, 1939 |
| 2,526,740 | Gilmore | Oct. 24, 1950 |
| 2,535,623 | Becker | Dec. 26, 1950 |
| 2,901,822 | Hayden | Sept. 1, 1959 |
| 2,930,642 | Howlett | Mar. 29, 1960 |